No. 630,425. Patented Aug. 8, 1899.
G. F. THOMPSON.
REAR AXLE AND REACH FOR VEHICLES.
(Application filed May 25, 1899.)
(No Model.)
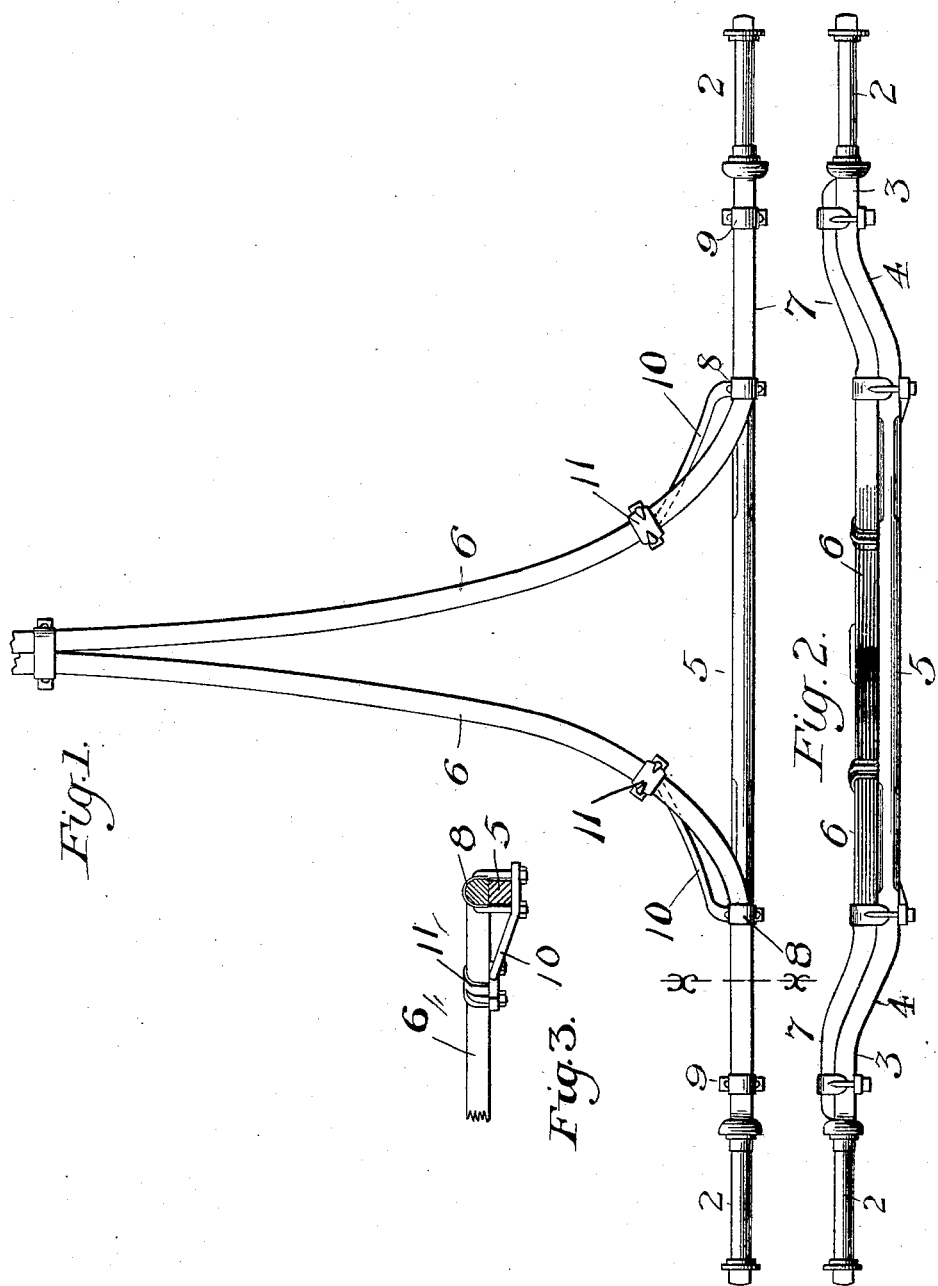
Witnesses:
E. G. Staude
Richard Paul.
Inventor.
George F. Thompson
By Paul & Hawley
his attorneys
THE NORRIS PETERS CO., PHOTO-LITHO., WASHINGTON, D. C

UNITED STATES PATENT OFFICE.

GEORGE F. THOMPSON, OF MINNEAPOLIS, MINNESOTA.

REAR AXLE AND REACH FOR VEHICLES.

SPECIFICATION forming part of Letters Patent No. 630,425, dated August 8, 1899.

Application filed May 25, 1899. Serial No. 718,182. (No model.)

*To all whom it may concern:*

Be it known that I, GEORGE F. THOMPSON, of the city of Minneapolis, county of Hennepin, State of Minnesota, have invented certain new and useful Improvements in Rear Axles and Reaches for Vehicles, of which the following is a specification.

My invention relates to carriages or buggies, and in particular to rear axles and reaches therefor and the means whereby the same are more strongly and rigidly connected than hitherto.

The object which I have in view is to provide a new form of reach-and-axle connection for use upon buggies or carriages having two bent reach parts. Hitherto I have employed straight rear axles and reaches made of two wooden bars bent at the rear ends, the extreme ends being carried into line with the axle and secured thereon, the ends of the reaches forming the axle-stock upon which the springs and body were secured. In so doing I found difficulty in securing the ends of the reaches so as to prevent their twisting and turning and loosening upon the axle. To obviate this difficulty, my present invention embodies a rear axle having a depressed central portion, the depression beginning at a short distance inside of the wheel-bearings, with bent wooden reaches which not only curve laterally into line with the axle, but also have upward curves at the ends conforming to the short curves in the axle and secured firmly thereon, the result being that the ends of the reaches in reality form crank-arms, the points of fastening being one above the other, and thus, having greater strength, lessen and practically avoid liability of these parts and the axle to twist with respect to one another.

The invention will be more readily understood by reference to the accompanying drawings, forming part of this specification, and in which—

Figure 1 is a plan view showing the rear axle of the buggy and the rear portions of the two parts of the reach. Fig. 2 is an end view thereof. Fig. 3 is a sectional view on the line $x\ x$ of Fig. 1.

In the drawings I have shown a rear axle having its middle portion depressed. This axle is made up of the bearing parts or ends 2, the short straight parts 3, the downwardly-ogee-curved portions 4, and the longer and straight middle section 5. This middle section is thus depressed considerably below the center of the axle and the wheels. The curves therein are comparatively short and quite deep. The curved parts are flat on the top, while the middle portion may be of any form desired, so long as short flat portions are left between the same and the lower part of the curved portion to receive the inner parts of the reaches. The reaches 6 are joined at their forward ends in any suitable manner and connected with the bolster-piece, fifth-wheel, and forward axle, the forward axle having the common form, which is substantially the same as the rear axle which I have shown, though for a different purpose. The rear ends of the reaches gradually depart from one another and curve gradually until meeting the line of the axle at the bottom of the curved parts thereon. Thence the reaches extend in a straight line laterally, being in line with the axle. At the same time the ends 7 of the reach-bar are curved up and thence out, conforming to the shape of the axle, from their meeting points to the flat and straight portions 3 of the axle. The ends of the reach are secured upon the axle by U-clips 8 and 9, placed, respectively, at the lowest and highest points of the vertically-curved parts. The under sides of the reach-bars are flat, and a good solid bearing is thus afforded between the same and the axle. As the axle has the form of a crank-shaft, it is obvious that in order to turn it must overcome the strength of the upwardly-turned arms or ends of the wooden reach-bars as well as the natural torsion of the lower parts thereof. Forming the ends of the reach in this way in no wise prevents the use thereof as the axle-stock, and thus all of the advantages of this form of axle and reach are retained, while those specially named are added. Moreover, the front and rear axles are made symmetrical, and the general curved outline of the whole gear is symmetrically completed. When this style of axle and reach is employed in the construction of a side-spring buggy, I prefer to provide braces 10, having their rear ends connected to the U-shaped clips 8, on the under side of the axle and their forward ends connected to similar clips 11, provided on the curved reaches 6 at a point preferably near the axle 5. These braces not only strengthen the rear ends of the reaches, but prevent them from twisting or turning out of their proper position upon the top of the axle. When this construction is used in wagons known as "combination," having platform-springs at the rear and a forward elliptic spring, I prefer to employ longer braces 10, so that the point where they are connected to the reaches will be a greater distance from the axle than in a side-spring buggy.

While I have shown and described the reaches connected near their forward ends, I do not confine myself to this construction, as each reach may be connected independently to the forward axle and not connected at any point between the axles.

Having thus described my invention, I claim as new and desire to secure by Letters Patent—

1. The combination, with the axle and the depressed middle portion, with the intermediate curved parts of the reach-bars 6 having their ends curved into line with the axle, and also curved or bent upwardly to conform to the shape of the axle and secured thereon at substantially the lowest and highest points, substantially as described.

2. An axle having a depressed middle portion, in combination with reach-bars having their ends curved into line with the axle and also curved or bent to conform to the shape of the axle and secured thereon at substantially the highest and lowest points, and braces 10 connected to said axle and also to said reach-bars, substantially as described.

In witness whereof I have hereunto set my hand this 11th day of May, A. D. 1899.

GEORGE F. THOMPSON.

In presence of—
L. R. CLEMENT,
RICHARD PAUL.